United States Patent [19]
Stich

[11] 3,803,473
[45] Apr. 9, 1974

[54] VARIABLE TIME RATIO CONTROL HAVING SPEED POTENTIOMETER FAILURE PROTECTION

[75] Inventor: Frederick A. Stich, Milwaukee, Wis.

[73] Assignee: Allis-Chalmers Corporation, Milwaukee, Wis.

[22] Filed: May 7, 1973

[21] Appl. No.: 358,137

[52] U.S. Cl.................. 318/341, 318/349, 318/599
[51] Int. Cl. ............................................. H02p 1/44
[58] Field of Search..................... 318/341, 349, 599

[56] References Cited
UNITED STATES PATENTS

| | | | |
|---|---|---|---|
| 3,411,065 | 11/1968 | Tedd | 318/341 |
| 3,484,652 | 12/1969 | Thiele | 318/341 X |
| 3,562,617 | 2/1971 | Meier | 318/341 |
| 3,585,477 | 6/1971 | Shacknow | 318/341 |
| 3,689,818 | 9/1972 | Morton | 318/341 X |

Primary Examiner—B. Dobeck
Attorney, Agent, or Firm—Lee H. Kaiser

[57] ABSTRACT

A variable time ratio control for a vehicle traction motor has a speed potentiometer which controls the duty cycle of the voltage pulses applied to the motor and a potentiometer failure detection circuit which senses opening of the speed potentiometer and automatically reduces duty cycle to a low value.

10 Claims, 1 Drawing Figure

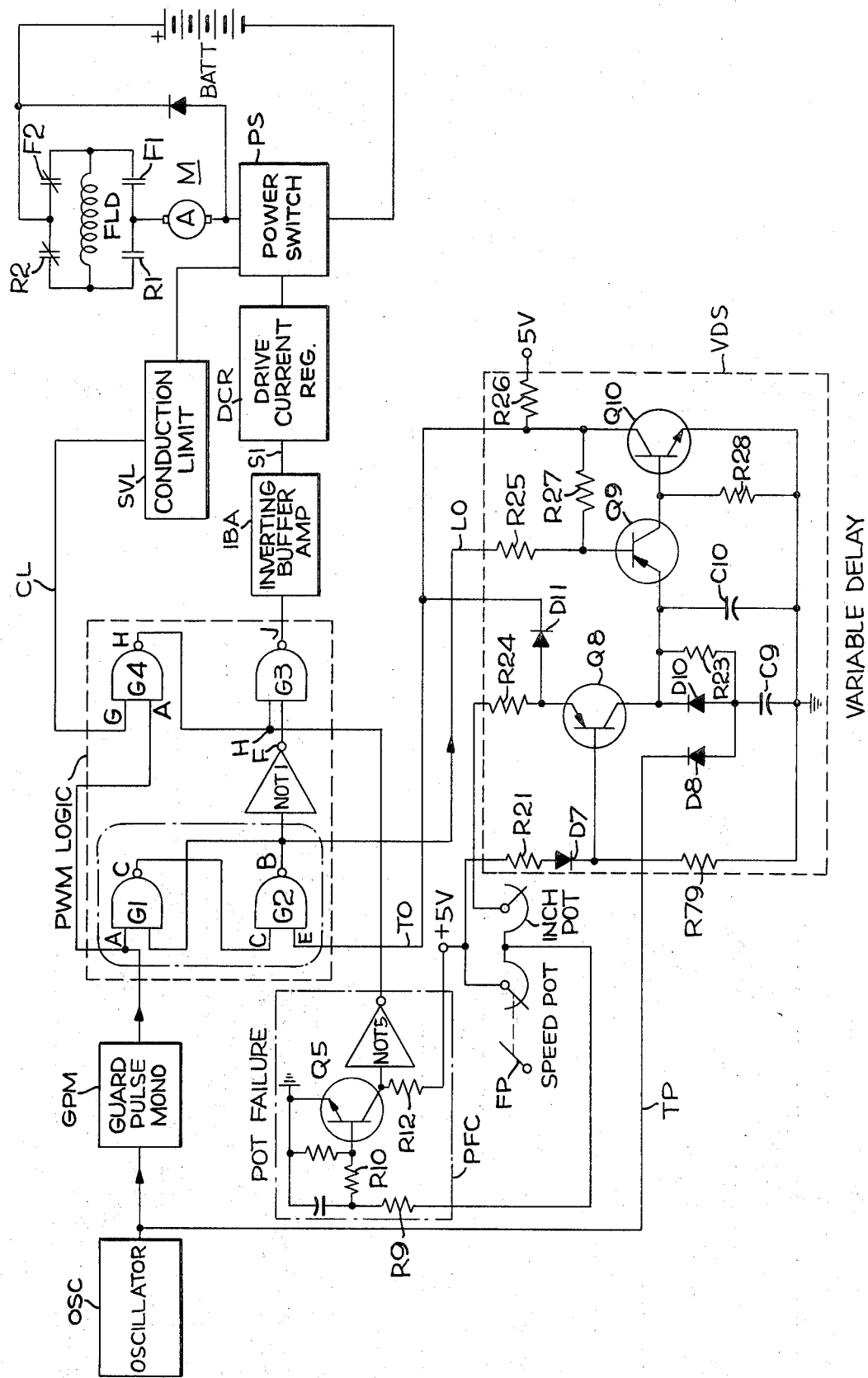

VARIABLE TIME RATIO CONTROL HAVING SPEED POTENTIOMETER FAILURE PROTECTION

BACKGROUND OF THE INVENTION

Variable time ratio controls such as those of the pulse width modulation (PWM) type for vehicle traction motors often utilize a speed potentiometer for controlling the duty cycle of voltage pulses applied to the motor to regulate vehicle speed. In prior art PWM systems, a speed potentiometer failure, such as caused by a faulty wiper or a discontinuity of the resistance element, usually resulted in 100 percent duty cycle with the consequent danger of loss of control of the vehicle by the operator.

It is an object of the invention to provide a variable time ratio control for a vehicle traction motor which detects an open circuit in the speed potentiometer and immediately reduces duty cycle of the voltage pulses supplied to the motor to a very low value.

This and other objects and advantages of the invention will be more readily apparent from the following detailed description when considered in conjunction with the accompanying drawing wherein the single FIGURE is a circuit diagram of a variable time ratio control embodying the invention with known elements represented in block form.

DETAILED DESCRIPTION

A variable time ratio control of the pulse width modulation (PWM) type embodying the invention may be similar to that disclosed in my copending application Ser. No. 317,596 filed Dec. 22, 1972 entitled "Control Having Conduction Limit Means to Vary Duty Cycle of Power Switch" and having the same assignee as this invention. The variable time ratio control may regulate a D.C. traction motor M having an armature A and a field winding FLD for driving the wheels of a fork lift truck. Armature A may be connected in series with field winding FLD and a power switch PS (shown in block form) across the terminals of a battery BATT through the normally open contacts F1 of a forward contactor and the normally closed contacts R2 of a reverse contactor to drive motor M in one direction to propel the lift truck forward or through the normally open contacts R1 of the reverse contactor and the normally closed contacts F2 of the forward contactor to reverse motor M and propel the truck to the rear.

Motor M is energized by unidirectional pulses of current from battery BATT conducted by power switch PS, and the speed of motor M is adjusted by the PWM system which controls the duty cycle of the variable width pulses of voltage applied to motor M to proportionally vary the average power applied to motor M. Power switch PS may be of the type disclosed in the copending application of Raymond G. Price et al., Ser. No. 317,595 filed Dec. 22, 1972 having the same assignee as this invention and comprises a plurality of paralleled silicon power transistors (not shown) whose base drive pulses are supplied by a constant current switching regulator DCR shown in block form.

The variable time ratio control also includes an oscillator OSC shown in block form which produces a train of triggering pulses that establish the frequency, preferably 300 Hz, of the system. Each pulse from oscillator OSC is fed into a guard pulse monostable multivibrator GPM shown in block form that produces a narrow negative-going guard pulse each time it is triggered by a pulse from oscillator OSC. The negative-going (logic 0) guard pulse from monostable GPM is an input to a NAND gate G1 and also to a NAND gate G4 of a PWM LOGIC circuit which determines the minimum on-time of power switch PS and also establishes the maximum time that power switch PS can operate in the unsaturated mode after it is turned on. Each negative-going triggering pulse from oscillator OSC fed over a lead TP to a varable delay circuit VDS permits a timing capacitor C9 to discharge through a diode D8, thereby assuring that the timing capacitor C9 always starts charging from the same voltage level at the beginning of each timing cycle.

Variable Delay Circuit

In the initial condition a NAND gate G2 of a PWM LOGIC circuit maintains a logic 1 signal on a lead L0 to variable delay circuit VDS which reverse biases the base of a timing transistor Q9 so that it cannot be turned on, thereby "locking out" delay circuit VDS and preventing it from initiating a time delay. Each negative-going guard pulse from monostable GPM changes the output of gate G1 of PWM LOGIC circuit to logic 1 which converts the output of gate G2 to logic 0 on lead L0 to activate the variable delay circuit VDS. The logic 0 signal on lead L0 forward biases the base of timing transistor Q9 and turns it on to initiate a timing cycle. An RC timing circuit in variable delay circuit VDS is reset by each triggering pulse from oscillator OSC, and variable delay circuit VDS provides a logic 0 signal at the end of the timing cycle on lead TO to terminate the control pulse and thus turn off power switch PS after a time delay determined by the settings of an inch potentiometer INCH POT and of a speed potentiometer SPEED POT whose position is regulated by a foot pedal FP on the lift truck. Thus variable delay circuit VDS is triggered by each oscillator pulse and provides an output pulse on lead TO after a time delay determined by the setting of the speed potentiometer SPEED POT to turn off power switch PS.

Variable delay circuit VDS includes a PNP charging current transistor Q8 whose collector current is varied to regulate the timing delay, a PNP timing transistor Q9 which is initially reverse biased by the logic 1 signal on lead LO to lock out the time delay circuit and which is responsive to a predetermined voltage on timing capacitor C9 to turn on an NPN transistor Q10 that applies ground (logic 0) on lead TO at the end of the timing cycle to provide logic 1 output from gates G2 and G3 of the PWM LOGIC circuit and thus turn off power switch PS. The base of charging circuit transistor Q8 is coupled to a voltage divider comprising the serial arrangement of a resistance R21, a diode D7, and a resistance R79 connected between a voltage source +5V and ground, and the collector of transistor Q8 is coupled through a timing resistance R23 in series with timing capacitor C9 to ground. The emitter of charging current transistor Q8 is connected to the +5V supply through the serial arrangement of an emitter resistor R24 and the INCH POT and SPEED POT potentiometers whose settings determine the magnitude of collector current in transistor Q8. As the resistnce of speed potentiometer SPEED POT is increased by depressing foot pedal FP, collector current in transistor Q8 will decrease so that the rate of rise of voltage at the emitter of transistor Q8 will be lower and the on-time of power switch PS will be longer.

PWM LOGIC Circuit

The PWM LOGIC circuit includes a bistable latch comprising interlocked NAND gates G1 and G2 with the output of each coupled to one input of the other. The output of gate G2 is coupled through a NOT gate NOT 1 to one input (F) of NAND gate G3 whose output (J) is coupled through an inverting buffer amplifier IBA, shown in block form, to lead S1 of drive current regulator DCR, and the output (B) of gate G2 is also connected to lead LO to variable delay circuit VDS. The logic 0 on lead TO when variable delay circuit VDS times out is applied to one input of NAND gate G2. A NAND gate G4 receives the guard pulses on one input (A) and the other input (G) is coupled to lead CL from a conduction limit circuit SVL shown in block form.

A triggering pulse from oscillator OSC on lead TP discharges timing capacitor C9 in delay circuit VDS and also causes monostable multivibrator GPM to apply a logic 0 guard pulse to input A of gate G1 which sets the bistable latch with logic 1 output from gate G1 at point C. The lgoic 1 from gate G1 is coupled to an input to gate G2 and changes its output to logic 0 on lead LO which unlocks the delay circuit VDS. The logic 0 from gate G2 is converted by gate NOT 1 to logic 1 input to gate G3, and the logic 0 guard pulse at input A changes the output of gate G4 to logic 1 at point H which is an input ot gate G3 Both inputs to gate G3 are now logic 1 and it provides a logic 0 output at point J which is the leading edge of the variable duty cycle control pulse and results in turning on power switch PS. When variable delay circuit VDS times out (i.e., when the voltage on timing capacitor C9 reaches a predetermined magnitude) timing transistor Q9 conducts to turn on transistor Q10 which clamps lead TO to ground and thus applies logic 0 to an input (E) of gate G2 to reset the bistable latch with logic 1 output (B) from gate G2. The logic 1 output from gate G2 is converted by gate NOT 1 to logic 0 input (F) to gate G3 which changes its output at point J to logic 1 to turn off power switch PS. The logic 1 output from gate G2 (B) is applied to lead LO to inactivate variable delay circuit VDS and is also applied to an input to gate G1 to change its output (C) to logic 0 and thereby reset the bistable latch.

Potentiometer Failure Detection

The potentiometer failure protection circuit PFC constantly monitors the resistance of speed potentiometer SPEED POT. Usually a potentiometer failure is caused by an open circuit as a result of a faulty wipe or a discontinuity in the resistance element. If the speed potentiometer SPEED POT became open, the PWM system would tend to go to 100 percent on-time of power switch PS and thus would tend to drive the motor M at maximum speed and can create an unsafe condition wherein the truck is out of control of the operator. The potentiometer failure circuit PFC senses opening of the potentiometer SPEED POT and immediately reduces on-time of power switch PS to the lowest possible value.

In the absence of potentiometer failure circuit PFC, opening of the speed potentiometer SPEED POT removes positive bias from the emitter of PNP charging current transistor Q8 which has the effect of reverse biasing its base relative to its emitter, decreasing collector (capacitor charging) current flowing through transistor Q8, decreasing the rate of rise to voltage on timing capacitor C9, and increasing on-time of power switch PS to a maximum. It will be noted that under such assumed open potentiometer condition, the truck operator no longer has control of the speed of motor M and the truck will tend to "run away."

An NPN potentiometer failure detecting transistor Q5 of circuit PFC has its collector coupled through a resistance R12 to the +5V supply and its emitter grounded. The base of transistor Q5 is connected through the series arrangement of two resistances R10 and R9 to the junction of the SPEED POT and INCH POT potentiometers. As long as speed potentiometer SPEED POT is continuous, positive base drive from the supply +5V is coupled through the series arrangement of SPEED POT, R9 and R10 to the base of transistor Q5 so that Q5 remains conducting. The collector of transistor Q5 is connected through an inverter, or NOT gate NOT 5 to input H of gate G3 of PWM LOGIC circuit. When transistor Q5 conducts, a substantially ground (logic 0) signal exists on its collector which is converted by gate NOT 5 to a logic 1 input to gate G3 of PWM LOGIC circuit so that gate G3 operates normally to transmit the control pulses to power switch PS in accordance with the output signals from gate G2, i.e., gate G3 provides a logic 0 signal to turn on power switch PS at the leading edge of each guard pulse and provides logic 1 output when variable delay circuit VDS provides logic 0 on lead TO at the end of the timing interval to turn off power switch PS.

If the speed potentiometer SPEED POT should open, base drive from supply +5V is removed from transistor Q5 and it turns off so its collector goes to logic 1 voltage. The logic 1 voltage is converted by gate NOT 5 to logic 0 at input H to gate G3 so that its output at J goes to logic 1 to turn off power switch PS.

Each negative-going (logic 0) guard pulse from monostable multivibrator GPM is applied to input A of gate G4 to apply logic 1 to input H of gates G3 and thus provide logic O output from gate G3 which turns on power switch PS at the leading edge of each guard pulse. However, if transistor Q5 is turned off, as soon as the guard pulse disappears the output of gate G4 goes to logic 0 and gate G3 provides a logic 1 output to turn off power switch PS. The width of the guard pulse is preferably 30 microseconds so that the on-time of power switch PS is automatically reduced to less than 1 percent whenever an open circuit exists in speed potentiometer SPEED POT.

Although the single embodiments of the invention has been illustrated and described as embodied in a pulse width modulation system, it will be appreciated that the invention is also applicable to other variable time ratio controls such as a frequency modulation control. While only a single embodiment of my invention has been described, many modifications and variations thereof will be readily apprent to those skilled in the art, and consequently it should be understood that I do not intend to be limited to the particular embodiment shown and described.

The embodiments of the invention in which an exclusive property or privilege is claimed are defined as follows:

1. A control for supplying variable duty cycle pulses from an electrical power source to a load including, in combination,
   means for providing a succession of control pulses,
   means including a speed potentiometer for selectively varying the duty cycle of said control pulses,
   a power switch regulated by said control pulses for connecting said power source to said load,
   potentiometer failure detecting means for generating a potentiometer failure signal when the circuit through said speed potentiometer is open, and
   means responsive to said potentiometer failure signal for overriding said duty cycle varying means and reducing the duty cycle of said control pulses.

2. A control in accordance with claim 1 wherein said potentiometer failure detecting means includes transistor means for generating said potentiometer failure signal and being arranged and connected to be in a first operating state wherein it generates said potentiometer failure signal, and
   means including a circuit completed through said speed potentiometer for biasing said transistor means to a second operating state, whereby said potentiometer failure signal is only generated when an open circuit exists in said speed potentiometer.

3. A control in accordance with claim 1 wherein said means to reduce the duty cycle of said control pulses includes
   means for generating a narrow guard pulse of the leading edge of each of said control pulses, and
   means responsive to each guard pulse to turn on said power switch and being responsive to said potentiometer failure signal in the absence of said guard pulse to terminate each said control pulse and thereby turn off said power switch.

4. A control in accordance with claim 3 wherein said means responsive to each said guard pulse to turn on said power switch includes logic gate means receiving said control pulses and being responsive to each said guard pulse to transmit said control pulse to said power switch and being responsive to said potentiometer failure signal in the absence of said guard pulse to block transmission of said control pulse.

5. In a variable time ratio control having a power switch regulated by variable duty cycle control pulses and means including a speed potentiometer for selectively varying the duty cycle of said control pulses, the improvement comprising
   means for detecting an open circuit in said speed potentiometer, and
   means controlled by said open potentiometer detecting means for reducing the duty cycle of said control pulses.

6. In the combination of claim 5 wherein said means for selectively varying duty cycle includes control pulse transmitting means adapted when enabled and disabled respectively to transmit said control pulses to and to block said control pulses from said power switch, and wherein said means for reducing duty cycle includes means controlled by said open potentiometer detecting means for disabling said control pulse transmitting means.

7. In the combination of claim 6 wherein said open potentiometer detecting means includes a detecting transistor connected and arranged to be in a first operating state, means including a circuit completed through said speed potentiometer for biasing said detecting transistor to a second operating state, and means responsive to said detecting transistor being in said first and said second operating states respectively for disabling and enabling said control pulse transmitting means.

8. In combination with a variable time ratio control having a power switch regulated by variable duty cycle control pulses and means including a speed potentiometer for selectively varying the duty cycle of said control pulses;
   logic gate means adapted when enabled and disabled respectively to transmit said control pulses to and to block said control pulses from said power switch,
   an open potentiometer circuit detecting transistor connected and arranged to be in a first operating state,
   means including a circuit completed through said speed potonetiometer for biasing said open potentiometer detecting transistor to a second operating state, and
   means responsive to said open potentiometer detecting transistor being in said first and in said second operating states respectively for disabling and for enabling said logic gate means.

9. A control for supplying variable time ratio pulses from an electrical power source to a load comprising, in combination,
   a power switch between said source and said load turned on and off by control pulses applied thereto,
   an oscillator for providing a succession of triggering pulses,
   a monostable multivibrator triggered by each oscillator output pulse to generate a narrow guard pulse,
   variable delay means operated by each said triggering pulse to provide a timing signal after a time delay which is selectively adjustable by a speed potentiometer,
   potentiometer failure detection means for providing a potentiometer failure signal when the circuit through said speed potentiometer is open,
   bistable logic gate latch means triggered to a first condition by each guard pulse to generate a control signal to turn on said power switch and triggered to a second condition by said timing signal to turn off said power switch, and
   logic gate means between said latch means and said power switch adapted when enabled to transmit said control pulses to said power switch and being disabled by said potentiometer failure signal in the absence of a guard pulse and being enabled by each said guard pulse.

10. A control in accordance with claim 9 wherein said potentiometer failure detecting means includes transistor means for generating said potentiometer failure signal when said transistor means is turned off, and electrical circuit means completed through said speed potentiometer for biasing said transistor means to the conducting state.

* * * * *